United States Patent [19]

Jumer

[11] 4,156,637
[45] May 29, 1979

[54] METHOD FOR ELECTRO-PROCESSING LARGE VESSELS

[76] Inventor: John F. Jumer, 16 W 131 Timber Trails Dr., Oak Brook, Ill. 60521

[21] Appl. No.: 777,781

[22] Filed: Mar. 15, 1977

[51] Int. Cl.² ............................ C25F 3/00; C25F 3/14; C25F 3/16
[52] U.S. Cl. ............................. 204/129.1; 204/129.6
[58] Field of Search .............. 204/129.1, 129.6, 129.35, 204/129.5

[56] References Cited

U.S. PATENT DOCUMENTS

| | | | |
|---|---|---|---|
| 3,682,799 | 8/1972 | Jumer | 204/212 |
| 3,919,061 | 11/1975 | Jumer | 204/218 |
| 4,001,094 | 1/1977 | Jumer | 204/212 |

*Primary Examiner*—T. M. Tufariello
*Attorney, Agent, or Firm*—Lockwood, Dewey, Alex & Cummings

[57] ABSTRACT

An apparatus and method for electro-chemical treating or electro-polishing the interior surfaces of a domed end, including an access port extending therefrom, of a large cylindrical vessel. For electro-polishing, the apparatus includes a cathode rod unit which is fastened to a mounting flange on the access nozzle such that the cathode thereof extends through the length of the nozzle in spaced relation to its interior surface. The cathode rod is insulated from the nozzle by a dielectric mounting disc positioned on the rod perpendicularly thereto. The external end of the cathode rod unit includes an electrical terminal to which direct current may be applied during electro-polishing. The external electrical terminal mounting lessens the amount of apparatus required to be inside the vessel during electro-polishing. The method for electro-polishing utilizes the cathode rod unit by mounting one of the same in each nozzle in one domed end before it is welded to a vessel body. The domed end is then stood upright and filled with an electro-polishing bath. An additional curved cathode is positioned in spatial relation to the dished interior surface of the domed end, and adapted for rotation to sweep across the entire dished surface. A direct electric current is passed between both cathodes and the vessel acting as an anode through the electro-polishing bath. Since both the cathodes can be charged at the same time, as well as separately, the entire interior surfaces of the domed end may be polished together.

6 Claims, 8 Drawing Figures

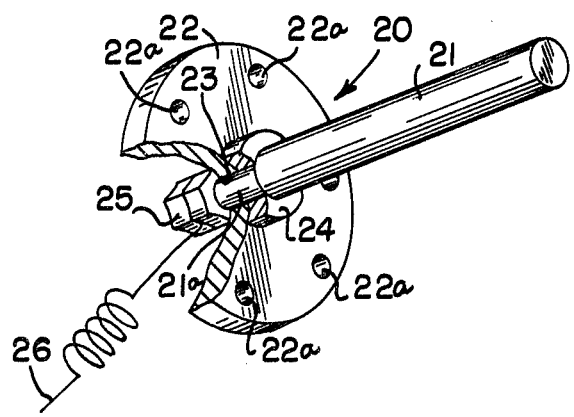
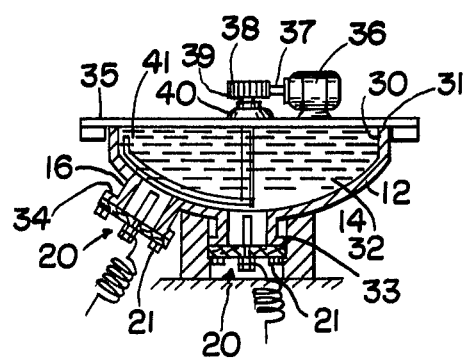
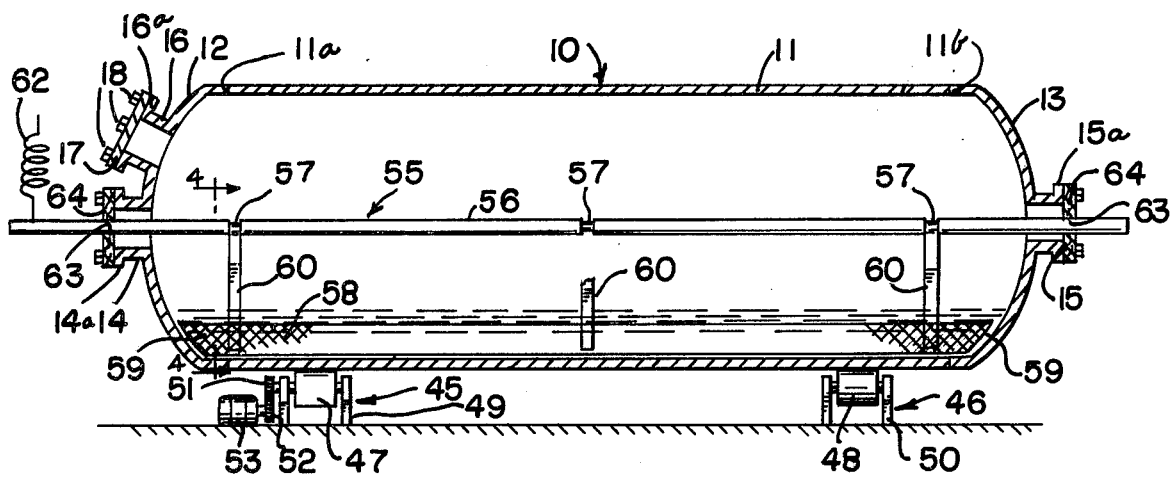
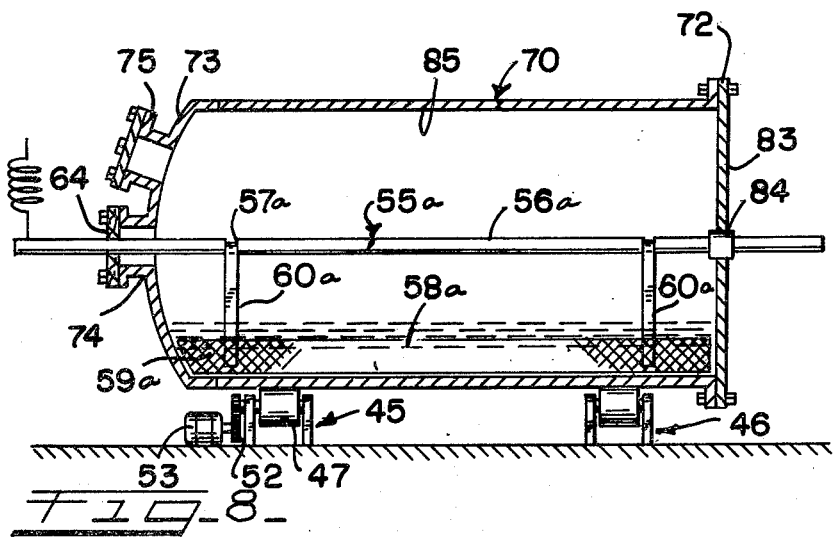

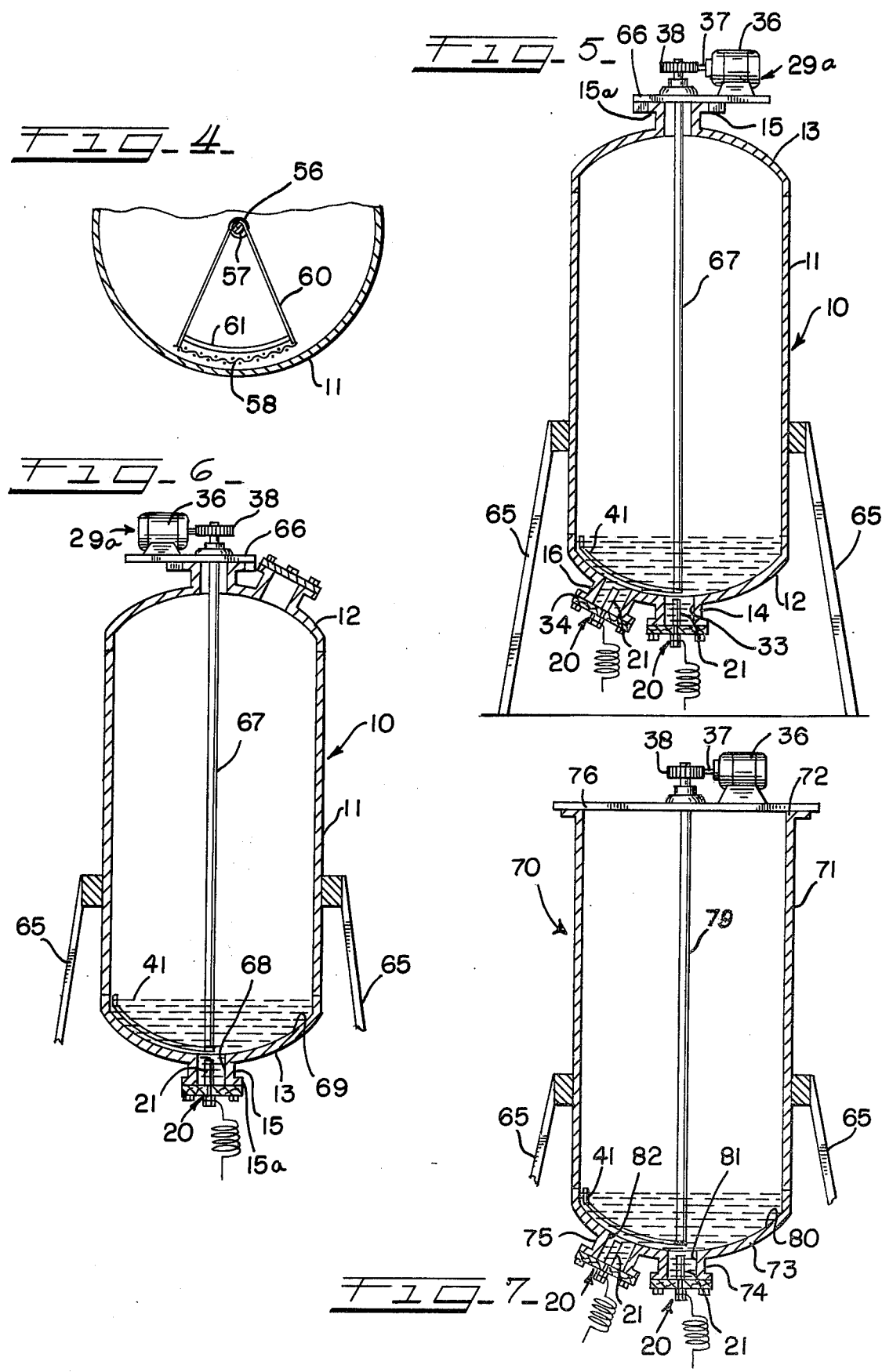

METHOD FOR ELECTRO-PROCESSING LARGE VESSELS

This invention relates, generally, to innovations and improvements in the electro-chemical treating or electro-polishing of the inner surfaces of large cylindrical vessels. More particularly, this invention relates to improvements in apparatus for electro-polishing access ports, nozzles, or manholes in large cylindrical vessels having at least one domed end thereto. The invention also relates to improved methods of electro-polishing the interior of such vessels which utilize the improved apparatus. The methods disclosed may be performed before or after the domed end or ends have been welded to the main vessel.

Large dome-ended vessels or reactors are used in many industries, including the petroleum, chemical, nuclear, pharmaceutical, food and beverage industries. In vessel installations wherein materials for human use or consumption are processed, sterile conditions and passive vessel interior surfaces are required. In these industries, electro-polished vessel interior surfaces provide high release properties which have improved resistance to corrosion, reduced frequency of cleaning, and facilitated vessel cleaning.

The art of electro-chemical treating and electro-polishing of vessel interiors is well-developed. For example, in my prior U.S. Pat. No. 2,861,937, dated Nov. 25, 1958, I have disclosed a method and apparatus for electro-polishing the interior surfaces of large vessels wherein the vessel need be filled with electrolyte only slightly more than one half full during polishing. In my prior U.S. Pat. No. 3,682,799, dated Aug. 8, 1972, I have disclosed methods of electro-polishing the interiors of cylindrical vessels by polishing the domed ends before they are welded to the hollow cylindrical body of the vessel. However, the patent teaches polishing the nozzles, manholes or access ports in a step which is separate from polishing the remainder of the domed end interior surface.

In my prior U.S. Pat. No. 3,919,061, dated Nov. 11, 1975, I disclosed a method for polishing a domed vessel with closed ends wherein the vessel is tilted at an acute axial angle with the ground surface and then rotated. The method disclosed therein has certain advantages, especially when performed in a fabricating shop where the vessel supporting stands are permanently mounted to a substantial flooring. In my prior U.S. Pat. No. 4,001,094, dated Jan. 4, 1977, I disclosed a method of incrementally electro-processing the interior of a large vessel, particularly when the vessel is permanently mounted in a vertical position. This method is particularly adapted for electro-polishing the interior of large vessels which have been in prior use.

While the above mentioned patents represent advances in the polishing art, known methods and apparatus for electro-polishing large vessels require polishing nozzles, manholes, or access ports separately from the remainder of the domed ends in which they are positioned. Further, the methods and apparatus disclosed heretofore require positioning the electrode leads inside the vessel.

It is therefore an object of the present invention to provide apparatus and methods for electro-chemical treating or electro-polishing nozzles, access ports, and manholes in domed members which are adapted to be welded to hollow cylindrical vessel bodies to form the end portions thereof.

Another object of the present invention is the provision of apparatus and methods for electro-chemically treating or electro-polishing the interior surfaces of nozzles, access ports and manholes in fully constructed large dome-ended vessels.

This invention is directed to an apparatus for electro-processing an access port in a cylindrical vessel or reactor together with the interior surface of the vessel or reactor which is positioned adjacent that port. The apparatus includes a disk made of dielectric material which is adapted to sealingly engage a mounting flange on the external end of the access port to be polished. The disk includes a central mounting hole therethrough. An electrode member is mounted through the central hole and includes an active portion which extends from one side of the disk and a mounting portion on which the disk is positioned. The active portion has a length approximating that of the access port. The mounting portion includes means for securing the disk to the electrode and an electrical terminal which extends from the opposing side of the disk and is adapted to retain an electrical conductor thereon in a position which is external to the vessel.

The invention is further directed to a method of electro-processing the dished interior surface of a domed end for a cylindrical vessel or reactor together with the interior surface of an access nozzle positioned on the domed end. The method comprises the steps of mounting an electrode rod unit to a flanged outer end of the nozzle with an electrode thereof extending into the nozzle; supporting the domed end in a vertical axial position with the interior dished surface thereof facing upwardly; mounting an electro-processing apparatus above the dished surface in fixed relation to it. The apparatus includes a mounting platform, a vertical shaft rotatably bearingly mounted through said platform, means for rotating the shaft, and a curved electrode mounted on the end of the vertical shaft in close spatial relation to the dished surface. The steps of the method further including: introducing an electro-processing bath in the domed end; applying voltage between both of the electrodes and the domed end through the electro-processing bath to produce an electro-processing action on the interior surfaces of the domed end; and rotating the curved electrode over the interior surface of the domed end.

The features of the present invention, which are believed to be novel, are set forth with particularity in the appended claims. This invention may best be understood by reference to the following description of a presently preferred embodiment and method, taken in conjunction with the accompanying drawings, in the several figures of which like reference numerals identify like elements, and in which:

FIG. 1 is a vertical longitudinal sectional view of an elongated cylindrical vessel with domed ends supported for rotation about its axis of revolution and with apparatus in place for electro-polishing the inner cylindrical surface.

FIG. 2 is a perspective view, with portions cut away, of a cathode rod unit adapted to be mounted in a nozzle, access port or manhole of a large cylindrical dome-ended vessel, including an externally mounted electrical lead therefore.

FIG. 3 is a vertical sectional view through one of the domed ends before being welded to the cylindrical body and showing cathode rod units in place for electro-polishing the inner surfaces of the access ports therein while the remainder of the interior surface thereof is also being electro-polished.

FIG. 4 is an enlarged fragmentary sectional view taken on line 4—4 of FIG. 1.

FIG. 5 is a vertical sectional view of an upright positioned elongated cylindrical vessel with domed ends and with apparatus in place for polishing the lower domed end thereof and the access ports in that domed end.

FIG. 6 is a vertical sectional view similar to FIG. 5 wherein the vessel has been up-ended to electro-polish the opposing end of the vessel.

FIG. 7 is a vertical sectional view of an upright positioned elongated cylindrical vessel with a single domed end and with apparatus in place for electro-polishing the inner surface of the domed end and the access ports thereto.

FIG. 8 is a vertical longitudinal sectional view of the vessel shown in FIG. 7 with apparatus in place for electro-polishing the inner cylindrical surface.

Referring to FIG. 1, a large cylindrical vessel of the type to which the apparatus and methods of the invention are particularly applicable, is generally indicated at 10. Vessel 10 includes a hollow cylindrical main body portion 11 and domed ends 12 and 13, respectively, which are welded to the opposing annular end surfaces 11a and 11b, respectively, of the body to form the vessel 10. The domed ends of a vessel conventionally include necked openings or nozzles 14, 15, extending outwardly from each domed end 12, 13 respectively, along the longitudinal vessel axis. These necked openings provide access to the interior of the vessel and may be accompanied by one or more similar access ports or manholes 16 positioned so as to extend from one or both ends of the vessel. Nozzles 14, 15, and 16 include annular flanges 14a, 15a, and 16a, respectively, at the outer ends thereof with mounting holes positioned therethrough in even spatial relation therearound. In operation, nozzles 14, 15, and 16 may be attached to inlet and outlet piping (not shown) or may be closed by a disc-shape cover 17 fastened thereto by bolts 18. Conventionally, vessels 10 may be of very large capacity. For example, the vessel may be 25 feet high with a diameter of 8 feet. Vessels 10 are preferably made of steel, with stainless steel lining being a required material for many uses.

Referring to FIG. 2, a cathode rod unit for electro-polishing the interior surfaces of a vessel nozzle is generally indicated at 20. Unit 20 includes an electrically conductive cathode 21. While copper rod 21, in this embodiment, is a solid bar, it can be appreciated that a tubular or foraminous member may also be utilized within the scope of the invention. The cathode rod unit 20 further includes a disc-shape member 22 made of dielectric material having a hole 23 centrally therethrough in which the rod 21 is mounted. A sealing member 24 is positioned around a narrowed portion 21a of rod 21 and adjacent hole 23 of dielectric disc 22 for providing a sealing relation therebetween. An electrical terminal 25, which in this embodiment includes a pair of standard nuts, are threaded on the outer end 21a of copper rod 21 to provide a means for securing an electrical conductor 26 thereto. The terminal 25 also maintains the disc 22 mounted on the rod 21. It can be appreciated that another type of electrical terminal may be formed on the end 21a of copper bar 21 within the scope of the invention. The length of the major portion of copper bar 21 approximates the length of the nozzle to be electro-polished.

Referring to FIG. 3, if the domed ends 12, 13 have not yet been welded to the hollow body 11 of vessel 10, it is preferred that the inner surfaces of those domed ends be polished before the vessel is assembled. Referring to FIG. 3, the domed end 12 of vessel 10 is shown as it appears during electro-polishing. In this embodiment, the surfaces of domed end 12 are electro-polished together and include a cylindrical inner surface 30 positioned adjacent top lip 31, and a semi-spherical or dished surface 32 positioned inwardly adjacent cylindrical surface 30. Additionally, in this embodiment, two hollow cylindrical surfaces 33, 34, which define the interior of nozzles 14, 16, respectively, extend outwardly from the dished surface 32.

The apparatus and method of the invention may be utilized to electro-polish or electro-chemically treat all of the interior surfaces on domed end 12 together. Electro-polishing will be described in detail. First, a cathode rod unit 20 is fastened with bolts 18—18 to each of the mounting flanges 14a, 16a on access ports 14, 16, respectively, such that the copper cathode 21 extends axially along the length of the port. The domed end 12 is then positioned so it rests on the protruding port 14, or the domed end may be otherwise held in an upright position by support members 27—27, and additional electro-polishing apparatus generally indicated at 29, is put in place for electro-polishing the primary interior surface of the domed end. The support members 27—27 are preferably made of electrically conductive material in order to provide proper grounding for electro-polishing. The additional apparatus 29 consists of a dielectric support or mounting platform 35 which rests on the upper edge or lip 21 of domed end 12 and serves to support an electric motor 36. The shaft of motor 36 is provided on its outer end with a worm (not shown) for driving a gear 38 mounted on the upper end of a vertical shaft 39 suitably supported and journaled for rotation in a bearing 40 mounted on the platform 35. It can be understood that shaft 39 may be rotated by means other than by a motor 36, such as by hand. Further, rotation may be accomplished in incremental as well as continuous movements.

A cathode 41 which is preferably sector or pie shaped is supported on the bottom end of shaft 39 and is contoured to follow the curvature of the interior surfaces 32, 30 of the domed end 12 in uniform spaced proximity thereto.

An electric conductor is connected to the bearing 40 to provide a direct current to the cathode 41 through the bearing 40 and shaft 39 so as to make same a negative pole. Also, electrical conductors are connected to each terminal 25 on the respective cathode units 20 mounted on nozzles 14, 16 to provide an electrical connection to negatively charge each cathode bar 21—21. With the domed end 12 suitably grounded, electro-polishing current flows between the inner surface 32 of the domed end and the respective cathodes 21—21 and 41 in known manner. The cathode 41 sweeps over the dished surface 32 on the rotation of shaft 39 by motor 36, and as the cathodes 21—21 are maintained in the respective nozzle interior surfaces, the inner surfaces of the domed end 12 are electro-polished. It can be understood that the time to electro-polish the large dished surface with a movable cathode is appreciably greater than the time to electro-polish a small port with a stationary cathode. Further, the ports and dished surface may also be polished separately.

It will be understood that the domed end 13 has the interior surface of its port 15 and the dished surface of the remainder of the domed end electro-polished in the same manner as described for the domed end 12 with the exception that there is no off-center protruding nozzle or access port thereon corresponding to nozzle 16. After the complete interior surface of the domed ends 12 and 13 have been electro-polished, these ends are suitably welded to the opposing ends 11a and 11b, respectively, of the cylindrical body 11 in known manner. Thereafter, the interior surfaces of the welds are polished with access for the polishing operation being gained through one of the open access ports or nozzles. Known equipment and techniques may be used for such mechanical polishing operations.

Referring to FIG. 1, for purposes of electro-polishing the interior surface of the main cylindrical body 11, the completely fabricated vessel 10 is horizontally cradled for rotation about its principal or longitudinal axis by placement on spaced pairs of supports indicated generally at 45 and 56, respectively. Each set of supports 45 and 46 consists of two separate sets of rollers 47—47 and 48—48, mounted in stands 49 and 50, respectively, with the stub shafts supporting the rollers being parallel.

A pinion gear 51 is mounted on the end of a stub shaft supporting one of the rollers 47 and has meshing engagement with a pinion gear 52 carried on the drive shaft of an electric motor 53. It will be understood that when the motor 53 is energized and drives the gear 52, one roller 47 will be driven and this will be sufficient to slowly rotate the completed vessel 10.

After the vessel 10 has been mounted on the rollers, a cathode assembly, generally indicated at 55, will be inserted into the interior of the vessel. This assembly comprises a long metallic shaft or rod 45 which may be either solid or hollow, preferably the latter. Intermediate its ends the rod or shaft 56 is provided with a plurality of grooves 57-57 (three being shown).

Referring to FIG. 4, the cathode apparatus 55 also includes in addition to the shaft or rod 56, an elongated copper mesh or screen 58 which may be folded, rolled, or disassembled for insertion through one of the protruding access nozzles or ports. At its extremities, the wire mesh cathode 58 is provided with up-turned ends 59—59 which are contoured so as to be evenly spaced from the adjacent curved surfaces of the adjacent domed ends 12 or 13. The cathode 58 is conveniently supported in a pendant manner from the shaft or rod 56 by a plurality of inverted V-shape supports or hangers 60—60.

Referring to FIG. 4, each of the supports 60 is in the form of a stiff metal strap or rod with the bight portion thereof curved so as to hang freely on one of the grooves or recesses 57. Supported on the outer ends of each of the hangers or V-shape supports 60 is an arcuate re-enforcing member 61 which serves to impart the proper radius of curvature to the foraminous cathode 58. The latter element is suitably attached to the outer ends of the V-shape hangers or supports 60.

After the cathode assembly is completed within the vessel 10, electro-polishing solution or bath is introduced to a depth sufficient to cover the arcuate cathode 58 and yet minimize the weight which has to be supported on the supports 45 and 46. Adequate grounding for the rotating metallic vessel 10 is provided by the metal supports so the current may be passed through the solution when the cathode is appropriately connected as by connector or conductor 62 to the appropriate terminal or pole of a source of a direct current. The shaft 56 is suitably held in a stationary position by passing it through central openings or holes 63 in the wooden blocks 64—64 which are bolted to the outer flanges of each of the protruding access ports or nozzles 14, 15. Since the cathode assembly hangs loosely down in a pendant position, the hollow cylindrical surface of the vessel body 11 may be electro-polished by rotating the vessel 10 on the supports 45 and 46.

While the domed ends of a cylindrical vessel are preferably polished before they are welded to the cylindrical vessel body, there may be instances, especially when a vessel is being re-polished, when the domed ends are to be polished after the vessel is completely fabricated, and assembled.

Referring to FIGS. 5 and 6, a preferred method of polishing the interior surface of the domed ends 12 and 13 of vessel 10 after those domed ends have been welded to the cylindrical body portion 11 includes supporting the vessel 10 in an axially vertical position. As shown most clearly in FIG. 5, the vessel 10 is supported by a suitable support or scaffold means 65—65. Supports 65—65 are preferably made of electrically conductive material so as to provide grounding for the vessel during electro-polishing. Vessel 10 is positioned with its axially aligned port 14 extending downwardly therefrom, i.e., with domed end 12 positioned similarly to that shown in FIG. 3. Next, the cathode rod units 20 are bolted to the flanged ends 14a and 16a of nozzles 14 and 16, respectively, such that the cathode rods 21—21 are positioned axially along the nozzles' interior surfaces 33, 34 to the inner edges thereof. While the units 20 are utilized in this method, it will be understood that this method may be practiced without the cathode rod units 20 within the scope of the invention.

An additional polishing apparatus, generally indicated at 29a, is put in place for electro-polishing the primary interior surfaces 30, 32 of the domed end 12. This apparatus is identical to the apparatus 29 shown in FIG. 3, with the exceptions of a different platform 66 sized to mount on the outer annular flange 15a of nozzle 15. A further exception from the apparatus 29 is the substitution of an elongate vertical shaft 67 which extends from the top of pinion gear 38 substantially through the vessel 10. The same sector-shaped or pie-shaped copper mesh cathode 41 utilized in the description of the first method may be attached to the bottom end of elongate shaft 67. A suitable electrolyte is then placed in the bottom portion of vessel 10 to a height sufficient to cover the upper end of curved pie-shaped cathode 41. It should be noted that substantially the same amount of electrolyte is utilized for electro-polishing the domed and 12 whether or not the domed end is welded to the vessel body 11. The domed end 12 is then electro-polished by rotating shaft 67 and passing direct current to the curved cathode 31 and cathode rods 21—21 to make the same negative electrical poles.

Referring to FIG. 6, after the domed end 12 is electro-polished, the electro-polishing apparatus 29a, the cathode rod units 21—21, and the electrolyte may be removed. The vessel is then turned 180 degrees by any suitable means such that the domed end 13 and the access port or nozzle 15 extending therefrom are facing downwardly. The vessel is again supported in a vertical position by supports 65. If supports 65 are not electrically conductive, other proper grounding must be provided. Next, a cathode rod apparatus 20 is bolted to the annular flange 15a of nozzle 15 such that the cathode rod 21 extends axially inwardly to the inner edge of the nozzle interior surface 68. The additional polishing apparatus 29a is put in place for electro-polishing the dished interior surface of the domed end 13 in a manner similar to that utilized in electro-polishing the domed end 12 shown in FIG. 5. The curved pie-shaped cathode 41 is attached to the lower distal end of elongate shaft 67 and is rotated by the shaft 67. Electrolyte is positioned in vessel 10 such that the upper end of pie-shaped cathode 41 is covered, i.e., approximately the same amount of electrolyte is utilized as that shown in FIGS. 3 and 5. The interior surfaces 69 and 68 of domed end 13 are then electro-polished by applying direct current to the cathodes 41 and 21, grounding the vessel body 10, and rotating the shaft 67 slowly.

After both domed ends of the vessel 10 are electro-polished in the manner shown in FIGS. 5 and 6, the interior surface of the cylindrical hollow body 11 may be electro-polished by the method shown in FIG. 1 and described above.

Referring to FIGS. 7 and 8, another type of large hollow cylindrical vessel is generally indicated at 70 and includes a hollow cylindrical body 71 having an open annular rim 72 at one end thereof and a closed domed end 73 at its opposing end. In this embodiment, the domed end 73 is shaped similarly to domed end 12 discussed above and includes an axially aligned hollow access port 74 protruding therefrom and an off-center access port 75 also protruding therefrom. In this embodiment, the domed end 73 is polished in the same manner as the domed end 12 shown in FIG. 5, with the exception of a larger dielectric base 76 which is substituted for base 66 in the apparatus for mounting the pie-shaped cathode 41 adjacent the dished inner surface 80 of domed end 73. Also, a new vertical shaft 81 may be substituted for shaft 67 if a differing length shaft is required to position the pie-shaped cathode 41 in proper spatial relation to the dished surface 80.

As with the previous embodiments, the vessel 70 is positioned on its longitudinal axis vertical and the domed end 73 and axially aligned access port 74 facing downwardly. The vessel is also supported by the supports 65, also shown in FIG. 5. Further, a cathode rod unit 21 is mounted in each of the respective access ports 74, 75, in a manner similar that described in connection with the method shown in FIGS. 3 and 5. It should be noted that while the cathode rod units 20—20 are preferred, the method may be practiced with other means for polishing the nozzles within the scope of the invention. When the cathode rods 21—21 and the pie-shaped cathode 41 are positioned correctly in a bottom end of vessel 70, the vessel is filled with electrolyte to the top of pie-shaped cathode 41, the vessel is grounded, and direct current is applied to the cathodes to electro-polish the domed end 73, while motor 36 turns shaft 79. The interior surfaces 81-82 of access ports 74, 75, respectively, may be electro-polished together with the electro-polishing of the dished surface 80, as described in the previous embodiments and methods.

Referring to FIG. 8, after the interior surfaces 80, 81, and 82 of the domed end 73 have been electro-polished, the vessel 70 is horizontally cradled for rotation about its principal or longitudinal axis by placement on the spaced pairs of supporting rollers 45 and 46 described above. A cathode apparatus 55a similar to that shown and described in FIG. 1 is abbreviated or cut off at one end thereof. The parts of the cathode apparatus shown in FIG. 1 which are abbreviated in FIG. 8 are indicated with the same numeral utilized in FIG. 1 having the suffix "a" therebehind in FIG. 8. The purpose and operation of the cathode apparatus shown in FIG. 8 is the same as the apparatus shown in FIG. 1. However, the open end of vessel 70 shown in FIG. 8 is covered by a dielectric disc 83 which is mounted thereover. Dielectric disc 83 includes a central bearing portion 84 positioned along the axis of vessel 70 which bearingly receives one end of the longitudinal shaft 50a to facilitate the pendency of the cathode 58a while the vessel 70 is rotated by motor 53 acting through pinion gears 51 and 52 to drive roller 47 which is rotatably mounted on stand 45. The lower portion of the vessel 70 is filled with electrolyte to a height similar to that used in the method shown in FIG. 1. It should be noted that disc 83 preferably does not cover the entire top opening of the vessel 70. It is preferred that disc 83 include at least one cut-out area for allowing gases to escape therethrough. It is sufficient that the disk 83 cover the vessel rim 72, and extend radially inwardly therefrom a distance sufficient to cover the height of electro-polishing bath placed in the vessel. Central bearing portion 84 may be supported in any known manner. The vessel 70 is grounded through the metal stands 45 and 46 and direct current is applied to the cathode 58 through the longitudinal shaft 56a and straps 60a—60a. As the vessel 70 is slowly rotated, the interior cylindrical surface 85 of the vessel is electro-polished. After the complete interior of the vessel has been electro-polished, the electricity may be disconnected, the electrolyte drained, and the cathode apparatus removed to complete the electro-polishing process.

While a particular embodiment of the cathode rod apparatus has been shown and described, and three variations of the method for electro-polishing the interior of vessels have been shown and described, it will be obvious to those skilled in the art that changes and modifications may be made without departing from the invention in its broader aspects. For example, the cathode rod units 20—20 may be utilized in conjunction with the various processing chamber cathode units shown and described in my prior U.S. Pat. No. 4,001,094, the contents of which is incorporated herein by reference. The processing chamber and cathode unit may be used for electro-polishing a nozzle and a portion of a large vessel interior surface immediately adjacent thereto. Therefore, the aim in the appended claims is to cover all such changes and modifications as fall within the true spirit and scope of the invention.

I claim:

1. A method of electro-processing the dished interior surface of a domed end for a cylindrical vessel or reactor and the interior surface of an access nozzle on said domed end, said method comprising the steps of:

mounting an electrode rod unit to a flanged outer end of said nozzle, said unit including an insulative disk adapted to mount directly on said flange, an electrode extending through said disk in fixed relation thereto and into said nozzle in substantially evenly spaced relation to the cylindrical surface thereof, and a terminal end of said electrode extending outwardly of said nozzle for attaching an electric lead thereto;

supporting said domed end in a vertical axial position with the interior dished surface thereof facing upwardly;

mounting an electro-processing apparatus above said dished surface in fixed relation thereto, said apparatus including a mounting platform, a vertical shaft bearingly mounted through said platform and along the axis of said domed end, means for rotating said shaft, and a curved electrode mounted on the end of said vertical shaft in close spatial relation to said dished surface and extending from the axis thereof to a position adjacent to the rim thereof;

introducing an electro-processing bath in said domed end and substantially filling same;

applying voltage between both said electrodes and said domed end through said electro-processing bath to produce an electro-processing action on the interior surfaces of said domed end; and rotating said curved cathode over the interior surface of said domed end.

2. In the method of fabricating and electro-processing the interior surfaces of an elongate cylindrical vessel having secured to at least one end of a cylindrical body a generally domed end including at least a centrally positioned outwardly protruding access nozzle, said method including the steps of:

electro-processing the interior surfaces of said domed end including the interior of each said nozzle thereon, circumferentially welding said interiorly polished domed end to one end of said cylindrical body, supporting said vessel in at least approximately level position for rotation with respect to its axis of revolution, introducing a shallow electro-processing bath into said vessel, freely suspending in spaced juxtaposed relation to the interior of the bottom of said vessel an elongate electrode in the shape of a rectangular cylindrical section substantially equal in length to the length of said cylindrical body and having approximately the same radius of curvature thereas, said electrode being pendantly suspended from a rod at least substantially co-axial with the axis of revolution of said vessel and with the opposite ends of said rod supported in electrically insulated relationship with said vessel, and applying voltage between said electrode and said vessel through said electro-processing bath to produce an electro-processing action on the interior of said cylindrical body portion of said vessel as said vessel is rotated;

the improvement wherein the step of electro-processing the interior surfaces of said domed end includes the steps of:

electro-processing said nozzle interior surface and said domed end interior surface by mounting an electrode rod unit on a mounting flange on said nozzle in sealing relation therewith and with the active end of an electrode thereof extending into said nozzle, and a terminal end thereof extending outwardly of said nozzle for attaching an electric lead thereto;

mounting an electro-processing apparatus on the rim of said domed end with a curved electrode thereof positioned in closely spaced relation to the dished interior surface of said dome end and extending from the center of said domed end to the rim thereof;

introducing an electro-processing bath into said domed end;

applying voltage between both said electrodes and said domed end through said electro-processing bath to produce an electro-processing action on the interior surface of said domed end, and rotating said curved electrode over the surface of said domed end.

3. A method of electro-processing the interior surface of an elongated cylindrical vessel or reactor including a cylindrical body and at least one domed end secured thereto, said method including the steps of:

supporting said vessel in a vertically upright position with the interior dished surface of said domed end facing upwardly;

mounting an electro-processing apparatus to the topmost surface of said vessel in fixed relation thereto, said apparatus including a mounting platform, a vertical shaft bearingly mounted through said platform and positioned along the axis of said vessel, means for rotating said vertical shaft, and a curved electrode mounted on the bottom end of said vertical shaft and positioned in close spatial relation to said dished surface and extending from the axis thereof to the top of said dished surface;

introducing a shallow electro-processing bath in said domed end to approximately the top edge of said dished surface;

applying voltage between said electrode and said domed end through said electro-processing bath to produce an electro-processing action on the interior surface of said domed end;

rotating said curved electrode over the interior surface of said domed end; then supporting said vessel in at least approximately level position for rotation with respect to its axis of revolution, introducing a shallow electro-processing bath into said vessel, freely suspending in spaced juxtaposed relation to the interior of the bottom of said vessel an elongated electrode in the shape of a rectangular cylindrical section substantially equal in length to the length of said cylindrical body and having approximately the same radius of curvature thereas, said electrode being pendantly suspended from a rod at least substantially coaxial with the axis of revolution of said vessel and with the opposite ends of said rod supported in electrically insulated relationship with said vessel, and applying voltage between said electrode and said vessel through said electro-processing bath to produce an electro-processing action on the interior of said cylindrical body portion as said vessel is rotated.

4. The method described in claim 3 wherein said domed end further includes at least one access nozzle thereon, and the step of mounting an electro-processing apparatus to the topmost surface of said vessel further includes the step of:

mounting the insulative disk of an electrode rod unit to a flanged outer end on said access nozzle with the electrode thereof extending into said nozzle and an electrical terminal thereon positioned externally of said nozzle.

5. The method defined in claim 3 wherein said one domed end further includes at least one access nozzle thereon, said vessel includes a second domed end positioned on the end of said cylindrical body opposite said one domed end, and wherein said second domed end includes a second access nozzle thereon, after the step of rotating said curved electrode the method further includes the steps of:

upending said vessel and supporting same in a vertically upright position with the interior surface of said second domed end facing upwardly;

mounting said electro-processing apparatus to the flanged outer end of said nozzle on said one domed end whereby said curved electrode is positioned in close spatial relation to the interior surface of said second domed end;

introducing said electrode-processing bath into said second domed end;

applying voltage between said electrode and said vessel through said electro-processing bath to produce an electro-processing action on the interior surfaces of said second domed end; and rotating said curved electrode over the interior surface of said second domed end.

6. The method defined in claim 4 wherein said vessel includes a second domed end positioned on the end of said cylindrical body opposite said one domed end, and wherein said second domed end includes a second access nozzle thereon, after the step of rotating said curved electrode the method further includes the steps of:

upending said vessel and supporting same in a vertically upright position with the interior surface of said second domed end facing upwardly;

mounting said electrode rod unit to a flanged outer end on said second access nozzle with the electrode thereof extending into said nozzle;

mounting said electro-processing apparatus to the flanged outer end of said nozzle on said one domed end whereby said curved electrode is positioned in close spatial relation to the interior surface of said second domed end;

introducing said electro-processing bath into said second domed end;

applying voltage between said electrodes and said vessel through said electro-processing bath to produce an electro-processing action on the interior surfaces of said second domed end; and rotating said curved electrode over the interior surface of said second domed end.

* * * * *